US010162878B2

(12) United States Patent
Nuchia et al.

(10) Patent No.: US 10,162,878 B2
(45) Date of Patent: Dec. 25, 2018

(54) SYSTEM AND METHOD FOR AGGLOMERATIVE CLUSTERING

(71) Applicant: Tibco Software Inc., Palo Alto, CA (US)

(72) Inventors: Stephen Nuchia, Tulsa, OK (US); Daniel Scott, Broken Arrow, OK (US)

(73) Assignee: TIBCO Software Inc., Palo Alto, CA (US)

(*) Notice: Subject to any disclaimer, the term of this patent is extended or adjusted under 35 U.S.C. 154(b) by 479 days.

(21) Appl. No.: 14/718,804

(22) Filed: May 21, 2015

(65) Prior Publication Data

US 2016/0342677 A1 Nov. 24, 2016

(51) Int. Cl.
*G06F 17/30* (2006.01)
(52) U.S. Cl.
CPC ............... *G06F 17/30598* (2013.01)
(58) Field of Classification Search
CPC .................................................. G06F 17/30598
See application file for complete search history.

(56) References Cited

U.S. PATENT DOCUMENTS

| 7,739,284 B2 | 6/2010 | Aggarwal et al. |
| 2003/0193510 A1 | 10/2003 | Shin et al. |
| 2004/0139067 A1* | 7/2004 | Houle ............... G06F 17/30011 |
| 2009/0285454 A1* | 11/2009 | Xu ..................... G06K 9/00221 |
| | | 382/118 |
| 2011/0310088 A1 | 12/2011 | Adabala et al. |
| 2015/0139557 A1* | 5/2015 | Lin ..................... G06K 9/4642 |
| | | 382/220 |

OTHER PUBLICATIONS

Müllner, Daniel, "Modern hierarchical, agglomerative clustering algorithms," arXiv preprint arXiv:1109.2378, Sep. 12, 2011.*
Berkhin, Pavel, "A survey of clustering data mining techniques," Grouping multidimensional data, 25, p. 71, Feb. 2006.*
Franti et al., "Fast agglomerative clustering using a k-nearest neighbor graph," IEEE Transactions on Pattern Analysis and Machine Intelligence, 28(11), pp. 1875-188, Nov. 2006.*
Jain et al., "Data clustering: a review," ACM computing surveys (CSUR), 31(3), 264-323, 1999.*

(Continued)

*Primary Examiner* — Jay A Morrison
(74) *Attorney, Agent, or Firm* — McGuireWoods LLP

(57) ABSTRACT

An information handling system performs a method for finding a nearest neighbor of a point. In some embodiments, the method may be used for agglomerative clustering. The method includes projecting a space $\Theta$ of a first dimension with a first distance $\mu$ to a space P of a second, smaller dimension with a distance $\mu'$ by a projection function p. For all pairs of points $v_1$ and $v_2$ in $\Theta$, $\mu'(p(v_1), p(v_2)) \leq \mu(v_1, v_2)$, where p is the function that projects points in $\Theta$ to points in P. The method also includes selecting a point v in $\Theta$ and performing a search for its nearest neighbor in $\Theta$ by projecting v to P and locating a set S of nearest neighbors in P of p(v). A search is then performed in $\Theta$ of a set of S' of points that project onto the points in S.

20 Claims, 5 Drawing Sheets

(56) References Cited

OTHER PUBLICATIONS

"Modern Hierarchical, Agglomerative Clustering Algorithms," Daniel Müllner, Stanford University, Department of Mathematics; pp. 1-29, Sep. 12, 2011, http://arxiv.org/abs/1109.2378.
"Fast k-nearest-neighbor Search Based on Projection and Triangular Inequality," Jim Z.C. Lai, Department of Computer Science, National Taiwan Ocean University,Oct. 12, 2006, Pattern Recognition Society. Published by Elsevier Ltd.. pp. 351-35, doi:10.1016/j.patcog. 2006.04.024.

* cited by examiner

SYSTEM AND METHOD FOR AGGLOMERATIVE CLUSTERING

FIELD OF THE DISCLOSURE

The present disclosure generally relates to a system and method for agglomerative clustering.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. Information handling systems can perform agglomerative clustering on sets of data to determine clusters of possible interest.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
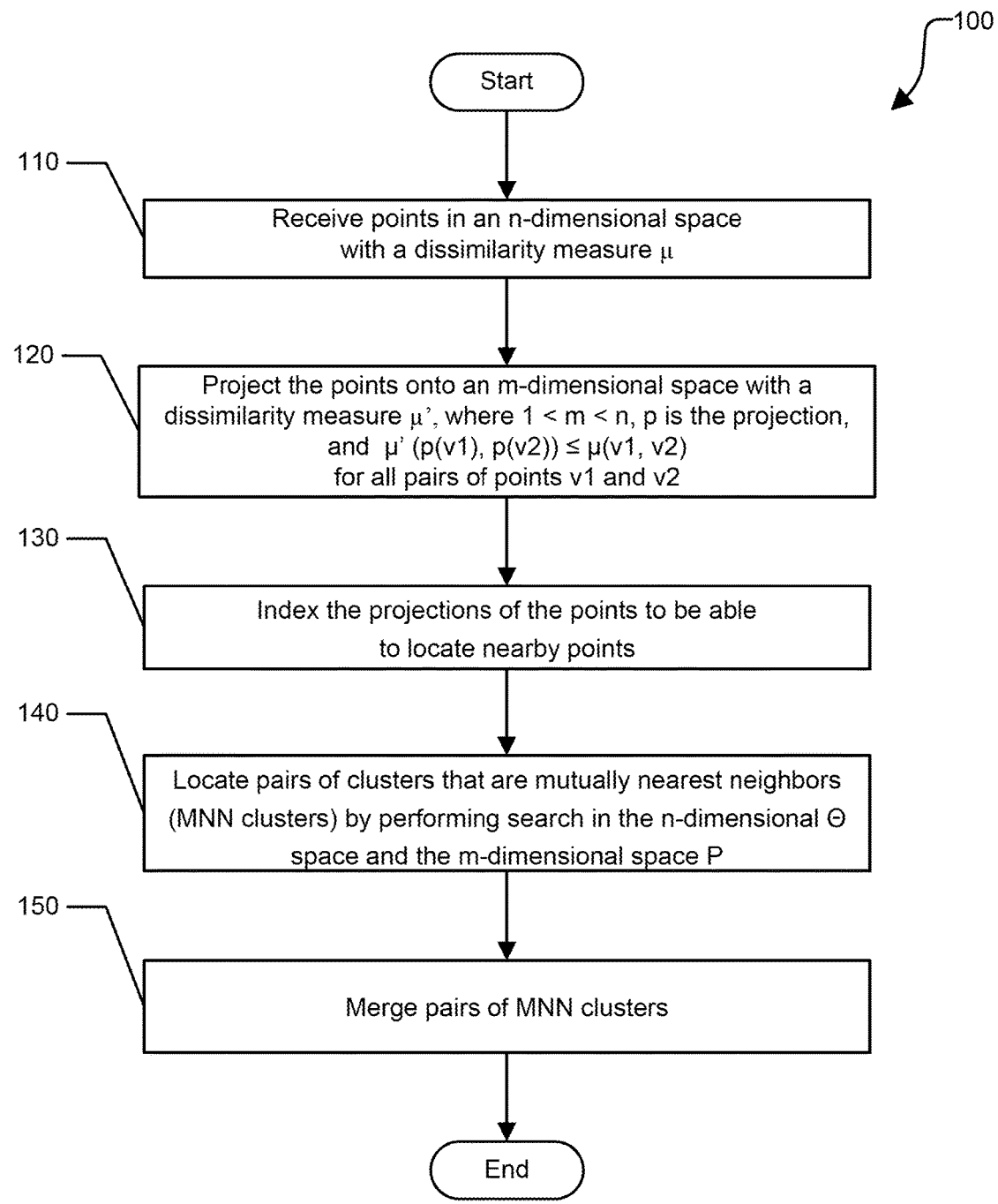
FIG. 1 is a flow diagram of a method for performing agglomerative clustering.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The information handling system can receive points in an n-dimensional space $\Theta$. The information handling system can merge the points to form clusters. Initially, each point is a separate cluster. The clusters can be merged until all of the points reside in a single cluster. $\Theta$ includes a dissimilarity measure $\mu$, which gives a notion of a distance between two clusters.

The clustering process may include projecting the points of $\Theta$ onto an m-dimensional space P with dissimilarity measure $\mu'$, where $1<m<n$, by a projection function p. The projection of a cluster C in $\Theta$ is the cluster in P resulting from the projection of each point of C. The projection function p may have the property that the dissimilarity measure in P between the projections of a pair of points or clusters does not exceed the dissimilarity measure in $\Theta$ between the pair of points or clusters. The projection function p may be based upon principal component analysis (PCA). It may also be based upon the norm of some components of points in $\Theta$. One example method for projecting to a space of m dimensions may compute the first m or more principle components and consider them in descending order of captured variance. At each step, if m' slots remain to be filled and the next component captures at least 1/m' of the remaining uncaptured variance, that component is assigned to that slot. If slots remain unfilled and no principle component exceeds the threshold, then projections onto norms can be used fill the remaining dimensions of the projection.

The projections of the points are indexed to be able to locate nearby points. A variety of multi-dimensional indexing data structures may be used. In many embodiments, R-trees or KD-trees may be used. The clustering process can also include locating pairs of clusters that are mutually nearest neighbors (MNN clusters) by performing search in the n-dimensional space Θ and the m-dimensional space P. The MNN clusters may be obtained by forming nearest neighbor (NN) chains. The search for the nearest neighbor of a cluster may begin by obtaining the nearest k neighbors of a cluster in P. The nearest neighbors may be based upon Euclidean distance in P and may be obtained by utilizing the indexing. The indexing may have a built-in feature to return the k nearest neighbors for any value k. The value for k may be heuristically determined. In some embodiments, it may be the square root of the population of Θ. In some embodiments, the NN chains may be formed in parallel.

FIG. 1 illustrates a method for performing agglomerative clustering. At block 110, points in an n-dimensional space Θ with a dissimilarity measure μ are received. The points may be received as the results of a manufacturing process. They may be, for example, generated during automated quality assurance testing. For any two clusters $c_1$ and $c_2$, $u(c_1, c_2)$ gives a notion of a distance between the two points. Θ is not required to be a vector space, and μ is not required to satisfy the requirements of a metric on a metric space, such as the triangle inequality. μ is, however, symmetric and non-negative. In many embodiments, however, Θ may be a Euclidean space, $R^n$, and the dissimilarity measure may be based upon Euclidean distance. If $v_i$ and $w_i$ are vectors in $R^n$, for some n, then the Euclidean distance between the two vectors is the norm of the difference between the two vectors:

$$(d(v, w)) = \left(\sum_{j=1,n} (v_j - w_j)^2\right)^{1/2} \quad \text{Eq. 1}$$

One example of a dissimilarity measure on Euclidean spaces is Ward's dissimilarity measure. Ward's dissimilarity measure between two clusters is basically weighted distance between centroids of the clusters, with the weight depending on the sizes of the clusters. For the initial population, the dissimilarity is isomorphic with the Euclidean distance and the weights monotonically increase as the computation progresses. For two clusters A and B, Ward's dissimilarity measure may be given by the formula:

$$\sqrt{\frac{2|A||B|}{|A|+|B|}} \cdot \|\vec{c}_A - \vec{c}_B\|_2 \quad \text{Eq. 2}$$

where A and B are two clusters, |A| and |B| are the number of points or weights of the clusters, and $\vec{c}_A$ and $\vec{c}_B$ are the centroids.

In other embodiments, Θ may be a mixed space with a partition that is a normed vector space, the dissimilarity measure may be written as a sum of non-negative contributions and a substantial amount of the variance may be captured in the partition that is a normed vector space.

At block 120, the points of Θ are projected onto an m-dimensional space P with dissimilarity measure μ', where 1<m<n, by a projection function p. The projection function p may have the property that the dissimilarity measure in P between the projections of a pair of points or clusters does not exceed the dissimilarity measure in Θ between the pair of points or clusters. Thus, for all pairs of points or clusters $v_1$ and $v_2$ contained in Θ:

$$\mu'(p(v_1), p(v_2)) \leq \mu(v_1, v_2) \quad \text{Eq. 3}$$

In some embodiments, n may be a relatively large number, on the order of 1000, and m may be between 3 and 5. Thus, the dimension of space P may be much smaller than the dimension of space Θ.

In many embodiments, the projection function p may be based upon PCA. This statistical procedure uses an orthogonal transformation to convert a set of observations of variables that may be correlated into a set of values of linearly uncorrelated variables called principal components. The process changes the basis for representing the points in Θ from an original basis to a basis composed of principal components (eigenvectors). The number of principal components is less than or equal to the number of original variables. In this procedure, the first principal component has the largest possible variance (that is, accounts for as much of the variability in the data as possible), and each succeeding component in turn has the highest variance possible under the constraint that it is orthogonal to (i.e., uncorrelated with) the preceding components. In these embodiments, a subset of the principal components, $u_1, \ldots u_j$ may be selected. Then, p may be defined on points in part by:

$$p_i(v) = \text{projection}(v, u_i)$$

In other words, the ith component of the projection of v onto P is the projection of P onto the ith principal component. In further embodiments, these projections $p_i(v)$ may account for all of the components of the projection of a point from Θ onto P.

In other embodiments, some of the components of the projection of a vector v in Θ may be based upon the norm of some components of v. In some instances, they may be based upon the norm of components of v as represented by the original basis. In other instances, they may be based upon the norm of projections of v onto principal components. One example method for projecting to a space of m dimensions may compute the first m or more principle components and consider them in descending order of captured variance. At each step, if m' slots remain to be filled and the next component captures at least 1/m' of the remaining uncaptured variance, that component is assigned to that slot. If slots remain unfilled and no principle component exceeds the threshold we construct index dimensions by partitioning the remaining dimensions in one of two ways.

In the first, with the original dimensions, compute the column-wise variance of the residuals after removing the assigned principle components from the data. Then, partition the dimensions (variables) into m' groups having approximately equal total residual variance in each group. For each group, take the magnitude of the residual in the corresponding subspace and treat is as a coordinate value in a new, related space.

In the second way, if the principle component analysis yields a complete or substantially complete set of components, partition the components not selected directly as index dimensions and take the magnitude of the projections into each subspace as the coordinate value for the corresponding dimension in the index space. The residual magnitude dimensions, whether computed from input dimensions or the remaining principle components, fill the remaining slots in our m-dimension index space.

Figure 2:
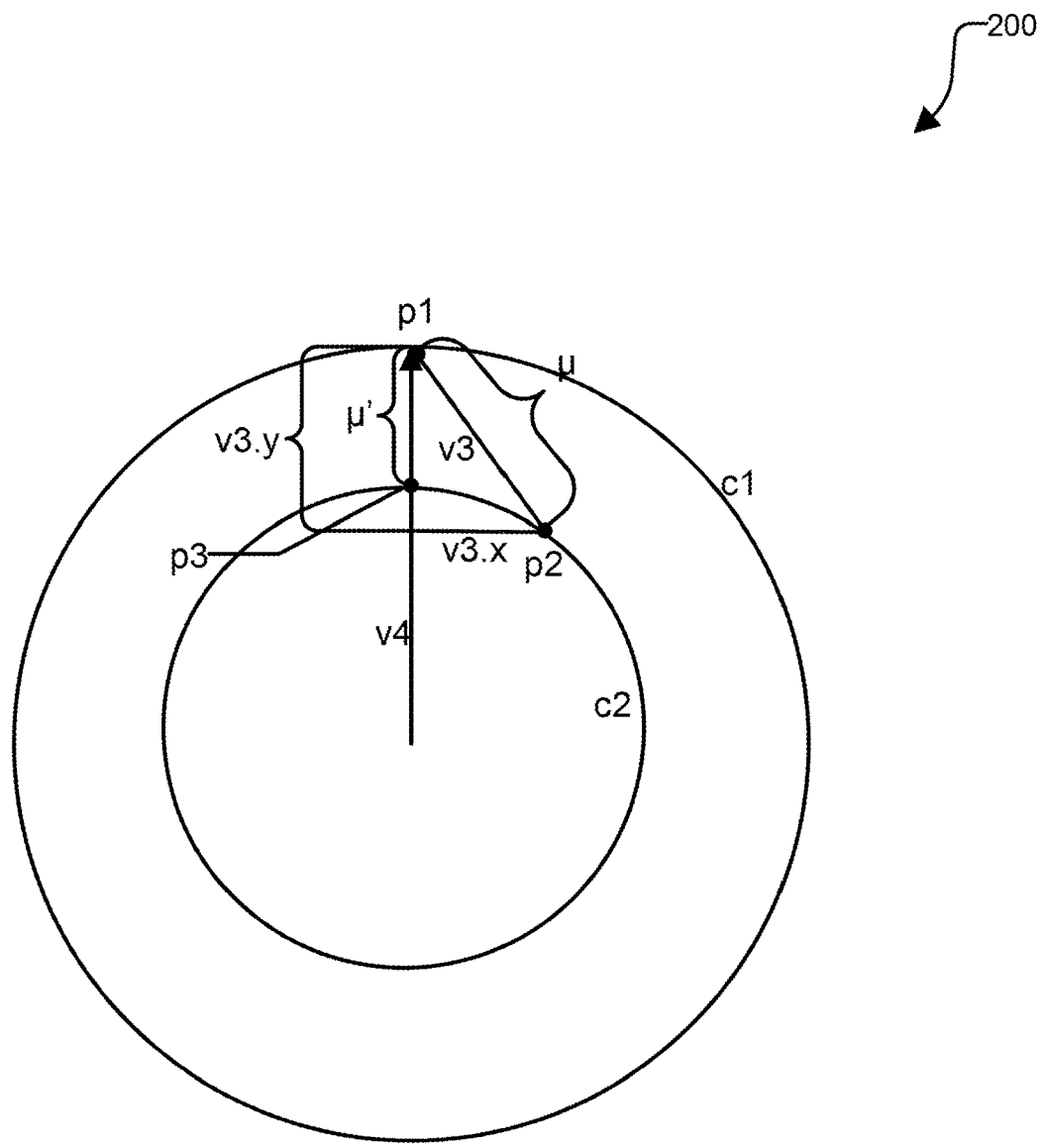
FIG. 2 is a diagram illustrating the effect of the norm projection function on dissimilarity measure.

FIG. 2 illustrates an effect of the norm projection function on dissimilarity measure. FIG. 2 includes point p1 on circle c1, points p2 and p3 on circle c2, and line segments v3, v3.x, v3.y, and v4. Points p1 and p2 are in the two-dimensional space Θ of FIG. 2. In space Θ, the dissimilarity μ between two points is indicated as Euclidean distance, the length of the chord between the two points. Thus, μ(p1, p2), the dissimilarity between p1 and p2, is indicated by the length of the chord v3 between the p1 and p2. In FIG. 2, the points p1 and p2 are projected according to their norms to a space P. For ease of illustration, the projections are shown on line segment v4. Thus, p1 is projected to itself, and p2 is projected to p3. The dissimilarity measure in P is illustrated by the distance μ' along line segment v4; i.e. the radial distance between the two circles. Thus, the brace labeled μ' illustrates the dissimilarity in P between the projection of p1 and the projection of p2. In the example of FIG. 2, the projection does not increase dissimilarity between points. The chord can never be shorter than the radial distance and this is why the subspace distance is guaranteed to be a lower bound on the full space distance. In this particular example, $\mu(p1, p2)=(v3.x^2+v3.y^2)^{1/2}$ Since $v3.y>\mu'$, it is clear that the dissimilarity in Θ is greater than the dissimilarity in P.

that PCA analysis returns the vector (1,0,0,0) as a basis vector accounting for almost all of the variance. Then, the projection of a vector v onto this basis vector returns the first component of v, $v_1$. The second component of the projection is the norm of the projection of v onto its remaining coordinates.

TABLE 1

|    | A             | B             | C             | D             | E              | F             |
|----|---------------|---------------|---------------|---------------|----------------|---------------|
| 1  | (−3 −5 1 5)   | (1 3 −1 −3)   | (0 5 1 −5)    | (−3 −4 4 0)   | (−1 1 −3 −4)   | (−1 1 −5 1)   |
| 2  | (−3 7.1414285)| (1 4.358899)  | (0 7.1414285) | (−3 5.656854) | (−1 5.0990195) | (−1 5.196152) |
| 3  |               |               |               |               |                |               |
| 4  | from 1 to 10  | 12.165525     | 14.456832     | 5.91608       | 11.7046995     | 9.591663      |
| 5  |               | 4.8726244     | 3             | 1.4845743     | 2.858572       | 2.79          |
| 6  | from 2 to 10  |               | 3.6055512     | 9.949874      | 3.6055512      | 6.3245554     |
| 7  |               |               | 2.9567668     | 4.2053165     | 2.132552       | 2.1681774     |
| 8  | from 3 to 10  |               |               | 11.135529     | 5.8309517      | 9.433981      |
| 9  |               |               |               | 3.3472319     | 2.2740788      | 2.1872585     |
| 10 | from 4 to 10  |               |               |               | 9.69536        | 10.535654     |
| 11 |               |               |               |               | 2.076338       | 2.0523758     |
| 12 | from 5 to 10  |               |               |               |                | 5.3851647     |
| 13 |               |               |               |               |                | 0.09713268    |
| 14 | from 6 to 10  |               |               |               |                |               |
| 15 |               |               |               |               |                |               |
| 16 | from 7 to 10  |               |               |               |                |               |
| 17 |               |               |               |               |                |               |
| 18 | from 8 to 10  |               |               |               |                |               |
| 19 |               |               |               |               |                |               |

|    | G             | H             | I             | J             |
|----|---------------|---------------|---------------|---------------|
| 1  | (4 4 3 3)     | (2 −3 −5 5)   | (3 −2 −4 4)   | (4 5 −1 −3)   |
| 2  | (4 5.8309517) | (2 7.6811457) | (3 6.0)       | (4 5.91608)   |
| 3  |               |               |               |               |
| 4  | 11.74734      | 8.062258      | 8.426149      | 14.73092      |
| 5  | 7.1216116     | 5.029045      | 6.107607      | 7.106439      |
| 6  | 7.8740077     | 10.816654     | 9.327379      | 3.6055512     |
| 7  | 3.341697      | 3.4694843     | 2.587124      | 3.380061      |
| 8  | 9.219544      | 14.282857     | 12.80625      | 4.8989797     |
| 9  | 4.2091985     | 2.071544      | 3.209807      | 4.183477      |
| 10 | 11.090536     | 11.489125     | 10.95445      | 12.806249     |
| 11 | 7.002165      | 5.3942337     | 6.009804      | 7.0047984     |
| 12 | 10.908712     | 10.488089     | 9.486833      | 6.78233       |
| 13 | 5.0532885     | 3.9582036     | 4.100215      | 5.066319      |
| 14 | 10.099504     | 6.4031243     | 5.91608       | 8.5440035     |
| 15 | 5.040136      | 3.8955348     | 4.079972      | 5.0515637     |
| 16 |               | 11            | 9.327379      | 7.28011       |
| 17 |               | 2.7245584     | 1.014188      | 0.08512831    |
| 18 |               |               | 2             | 12.165525     |
| 19 |               |               | 1.95608       | 2.6674814     |

Table 1 illustrates the projection of points from a 4-dimensional space Θ into a 2-dimensional space P. Each point in Θ is a vector with four components and each point in P is a vector with two components. Row 1 of table 1 contains ten randomly generated vectors in Θ. Row 2 contains projections of those vectors. The function p mapping Θ into P is defined by:

$$p(a0, a1, a2, a3) = \left(ao, \left(\sum_{1}^{3} ai^2\right)^{1/2}\right) \quad \text{Eq. 4}$$

The function p may be considered as a simple form of the projection functions described above, under the assumption Rows 4 through 21 contain the distances between the points in the two spaces, where distance is defined as Euclidean distance:

$$d(xi, xi') = \left(\sum_{j} (x_{ij} - x_{i'j})^2\right)^{1/2}$$

Each row contains the distances from the point specified in column A to the points to the right of that point. The distance appears under the column for the rightmost point of the pair. The even rows contain the distances between points in Θ and the odd rows contain the distances between points in P. For example, D:8 contains the distance between the points (0 5 1 −5) and (−3 −4 4 0) (the third and fourth points of Θ) and E:8 contains the distance between the projections of those points onto P. The distance contained in any cell on an even row is greater than the distance in the cell one row lower, thus illustrating that the projection of Eq. 4 does not increase distance. For example, F:6 is 6.32 and F:7 is 2.17, thus showing that the distance between the $2^{nd}$ and $6^{th}$ points in Θ are greater than the distance between the projections of those points.

TABLE 2

A. Original points:
{{1.04948, 1.0553, 1.55128}, {3.08696, 2.61436, 2.62327}, {1.85333, 1.54252, 1.85866}, {3.18381, 3.15849, 2.86839}, {1.68765, 1.60431, 1.45189}, {2.1523, 1.85515, 1.7795}, {1.10282, 1.79985, 1.22821}, {2.01587, 2.18549, 2.60494}}

B. Covariance eigenvectors:
{{-0.673039, -0.545496, -0.499452}, {-0.160362, -0.5516, 0.818548}, {0.722012, -0.631008, -0.283772}}

C. Projection of points onto eigenvectors:
{{1.37561, 0.299621, 0.00947096}, {-1.38157, -0.00961907, 0.192572}, {0.415285, 0.153565, 0.195198}, {-1.86599, -0.124654, -0.150403}, {0.696251, -0.186909, 0.152013}, {0.0830693, -0.131625, 0.236248}, {1.09491, -0.384081, -0.330155}, {-0.417573, 0.383702, -0.304943}}

D. Capture of variance:
{0.633091, 0.438436, 0.382056}

E. Projection of points onto first eigenvectors
{37561 -1.38157 0.415285 -1.86599 0.696251 0.0830693 1.09491 .417573}

F. Residual variance after capture by first component: 0.122115

G. Projection of the points onto first eigenvector and norm in the space of last two eigenvectors
{{1.37561 0.299771} {-1.38157 0.192812} {0.415285 0.248363} {-1.86599 0.195345} {0.696251 0.240921} {0.0830693 0.270441} {1.09491 0.506479} {-0.417573 0.490119}}

H. Index space distance as a fraction of full space distance

| | 1 | 2 | 3 | 4 | 5 | 6 | 7 | 8 |
|---|---|---|---|---|---|---|---|---|
| 1 | | | | | | | | |
| 2 | 0.992 | | | | | | | |
| 3 | 0.972 | 0.996 | | | | | | |
| 4 | 0.991 | 0.801 | 0.982 | | | | | |
| 5 | 0.804 | 0.996 | 0.634 | 0.993 | | | | |
| 6 | 0.936 | 0.998 | 0.757 | 0.982 | 0.988 | | | |
| 7 | 0.429 | 0.976 | 0.717 | 1. | 0 | .73 | 0.876 | |
| 8 | 0.989 | 0.874 | 0.869 | 0.958 | 0.857 | 0.608 | 0.892 | |

Table 2 presents another example of the projection of points to a smaller dimensional space. Part A of table 2 lists the original points, which lie in a 3-dimensional vector space. In this example, they will be projected to a 2-dimensional vector space. Next, PCA is applied, yielding the three eigenvectors listed in part B. of the table. Note that in the example of table 2, the eigenvectors are not basis elements of the original vector space, which are the vectors {(1 0 0) (0 1 0) and (0 0 1)}. Part C lists the projection of the original points onto the eigenvectors. Part D. lists the capture of variance by the eigenvectors. Since the first eigenvector captures a large amount of the variance, the projection of the original points onto the first eigenvector is used as the first component of the projection of the original points onto the projected space.

Next, the residual variance after capture by the first component is calculated. The results are listed at Part F. As can be seen, the residual variance is relatively small. Thus, the second component of the projection is chosen as the norm of the vectors in the space of the last two eigenvectors. The complete projection is listed in part G. Part H shows the space distance in the projected space as a fraction of full space distance in the original space. As can be seen from Part H, none of the ratios exceed one. Thus, the distance between the projections of a pair of points to the two-dimensional space does not exceed the distance of the pair of points in the three-dimensional space.

Returning to FIG. 1, at block 130, the projections of the clusters are indexed to be able to locate nearby clusters. A variety of multi-dimensional indexing data structures may be used. In particular, any spatial indexing technique, existing or future, that is suitable for finding k-nearest neighbors and performing bounding-box searches in small fixed dimensions (such as dimension 3 to dimension 5) may be used. In many embodiments, KD-trees or R trees may be used. A KD-tree data structure may split a point set in a multi-dimensional space by alternating among components. Within each component, the points may be split so that one subtree contains points with a component value greater than or equal to a median value and another subtree contains points with a component value less than or equal to the median value.

R-trees are also tree data structures. Nearby objects are grouped and represented along with their minimum bounding rectangle in a next higher level of the tree. Each entry within a non-leaf node stores two pieces of data: a way of identifying a child node, and the bounding box of all entries within this child node. Leaf nodes store the data required for each child, often a point or bounding box representing the child and an external identifier for the child. The input to a search is a search rectangle (Query box). The search starts from the root node of the tree. For every rectangle in a node, it has to be decided if it overlaps the search rectangle or not. If yes, the corresponding child node has to be searched also. Searching is done like this in a recursive manner until all overlapping nodes have been traversed. When a leaf node is reached, the contained bounding boxes (rectangles) are tested against the search rectangle and their objects (if there are any) are put into the result set if they lie within the search rectangle.

Figure 3:
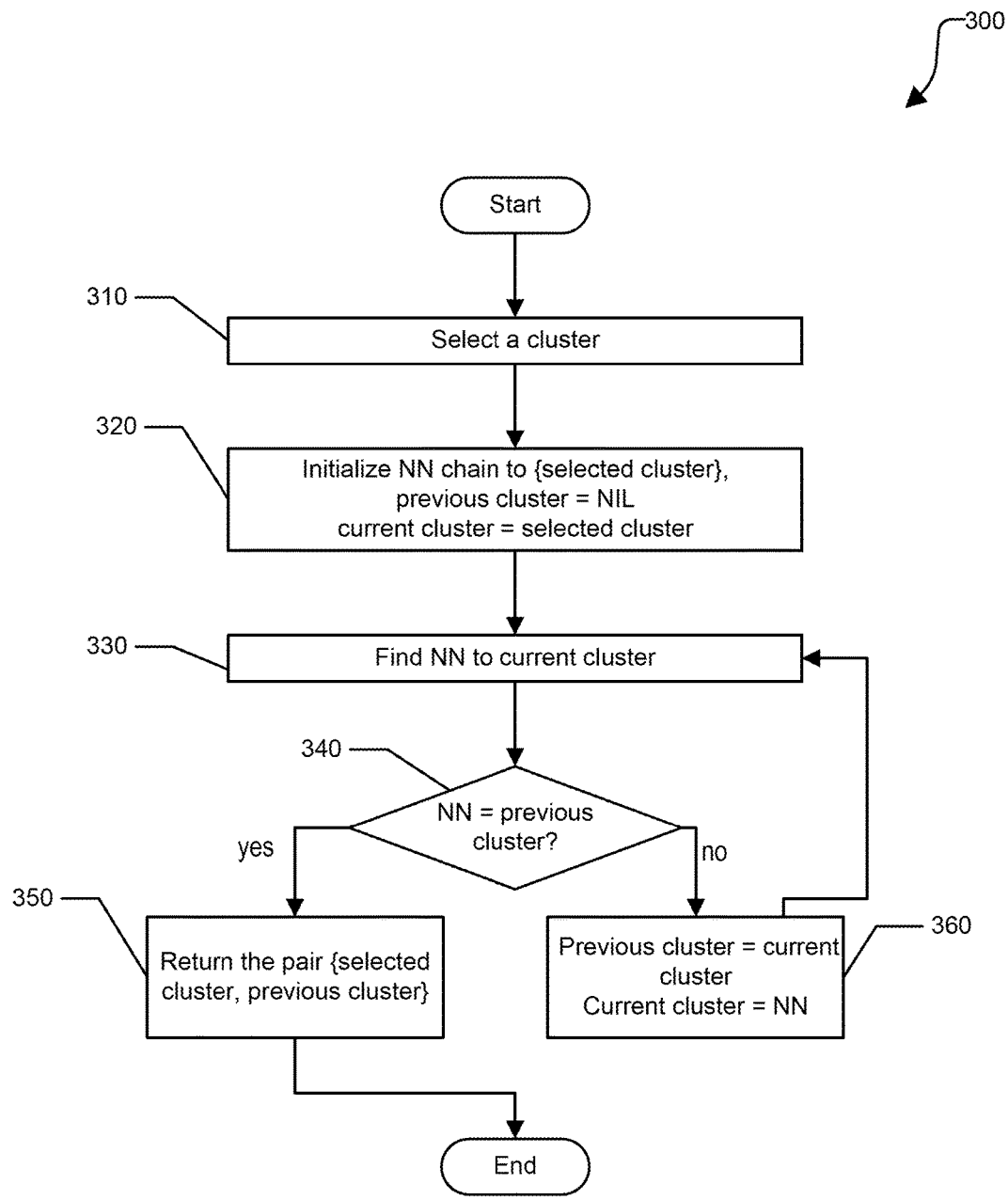
FIG. 3 is a flow diagram of a method for merging clusters by generating chains of nearest neighbors.

At block 140, pairs of clusters that are mutually nearest neighbors (MNN clusters) are located by performing search in the n-dimensional space Θ and the m-dimensional space P. The MNN clusters may be obtained by forming nearest neighbor (NN) chains. FIG. 3 presents a method of forming NN chains. At block 310, a cluster of points is selected. At block 320, the search parameters are initialized. The NN chain is initialized to {selected cluster}, a single cluster consisting of the selected cluster. In addition, the previous cluster is set to NIL, and the current cluster is set to the selected cluster. At block 330, the NN to the current cluster is found. The NN may be found by using indexing in the projected space P. At block 340, it is checked whether the NN is the previous cluster. If yes, then at block 350 the pair of clusters {selected cluster, previous cluster} is returned as a MNN pair of clusters. If not, then at block 360, the current cluster becomes the previous cluster, and the NN becomes the current cluster and the generation of the NN chain continues.

There may be ties in the search for a nearest neighbor to extend a NN chain. Given a non-empty chain { . . . X, Y} the method of FIG. 3 seeks a nearest neighbor of Y to extend the chain. But if it happens that X is a nearest neighbor of Y and the search finds another nearest neighbor Z, with μ(Y, X)=μ(Y, Z), choosing Z as the nearest neighbor of Y obscures the fact that X and Y are mutual nearest neighbors. Thus, in some embodiments, only if some Z≠X is found having a smaller dissimilarity will the nearest neighbor chain be extended. If no other cluster with a smaller dissimilarity to Y is found, then the search will end with the mutual nearest neighbor pair {X, Y} and the chain extension stops.

Figure 4:
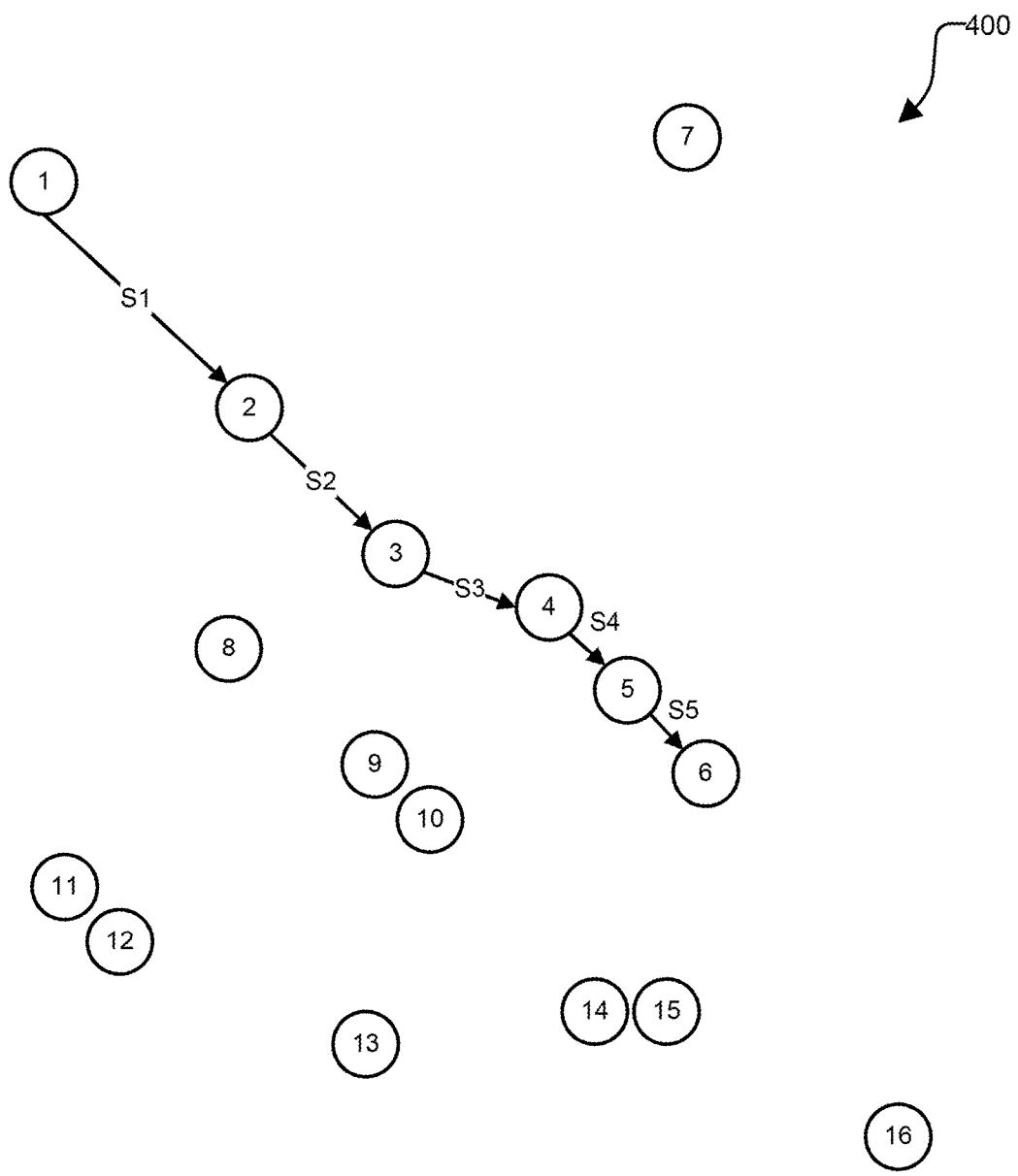
FIG. 4 is a graph of a generation of a chain of nearest neighbors.

FIG. 4 illustrates the generation of an NN chain. Nodes 1 through 16 represent clusters, and the edges S1 through S5 represent NN links between nodes. The generation of an NN chain begins with the selection of cluster 1. Its nearest neighbor is cluster 2, as represented by link S1. The nearest neighbor of node 2 is node 3, as represented by link S2. Similarly, the chain proceeds to finding node 6 as the nearest neighbor of node 5. At this point, the generation includes a search for the nearest neighbor of node 6. That turns out to be node 5. Since nodes 5 and 6 are each the nearest neighbor of the other, the pair {node-5, node-6} forms an MNN pair of clusters, and the generation of the NN chain halts. Note that although the generation of the NN chain terminated, that the closest pair of nodes was not found. Although the search returned nodes 5-6, in the example of FIG. 4, nodes 9-10 and nodes 14-15 are closer MNNs.

Table 3 illustrates an algorithm for finding a nearest neighbor of a cluster using dissimilarity measures $\mu$ in an original space $\Theta$ and $\mu'$ in a projection space P obtained by a projection p, where $\mu$ and $\mu'$ satisfy Eq. 3.

TABLE 3

Finding NN of a selected cluster C in a space $\Theta$.

Select C, a cluster in C.
Using indexing, find S = {$p_i$, $1 \leq i \leq k$} = the set of k nearest clusters to p(C) in P for some k.
Setq min_full_space_distance = + $\infty$, NN = NIL,
searched_bound_in_projected space = 0, current_NN = NIL
Start_loop
For each $p_i \in$ S,
    setq searched_bound_in_projected_space =
        max (searched_bound_in_projected_space, $\mu'$ (p(C), $p_i$))
    Setq current_full_space_distance = $\mu$(C,$C_i$), where p($C_i$) = $p_i$
    If current_full_space_distance < min_full_space_distance,
setq min_full_space_distance = current_full_space_distance;
current_NN = $C_i$
    If (searched_bound_in_projected space > backed-out
    (min_full_space_distance)
    AND (search in projected space was exhaustive) ) return current_NN
End_loop
If the loop terminates without returning a nearest neighbor, increase k and repeat the loop.

The algorithm of Table 3 is a method of finding a nearest neighbor of a cluster of points C in a space $\Theta$. The algorithm begins at line 3 by selecting a cluster C. In lines 4-5, the cluster C is projected to a cluster p(C) of a space P. Space $\Theta$ may be a high-dimensional space and the dimension of space P is greater than 1 and less than the dimension of space $\Theta$. In some embodiments, the dimension of space P may be between 3 and 5. Next, an indexing of space P is used to find the set S of k nearest neighbors of p(C) in space P. The nearest neighbors may be based upon Euclidean distance in P and may be obtained by utilizing the indexing. The indexing may have a built-in feature to return the k nearest neighbors for any value k. In some embodiments, the indexing of space P enables finding the k-nearest neighbors of p(C) efficiently. In particular, the indexing of space P may be more efficient for finding nearest neighbors of a cluster in P than an indexing of space $\Theta$ because the dimension of space P may be much smaller.

In lines 6 and 7, the variables min_full_space_distance, searched_bound_in_projected space, and current_NN are initialized. The variable searched_bound_in_projected_space keeps track of the extent of the search in space P, current_NN is the closest cluster to C currently found, and the variable min_full_space_distance is the dissimilarity measure from C to current_NN.

In the loop from lines 8 through 17, calculations are performed for clusters $p_i$ in S. At lines 10-11, searched_bound_in_projected_space is increased if $\mu'(p(C), p_i))$ is greater than the current value. At line 12, a cluster $C_i$ is found in the space $\Theta$ that projects to $p_i$. In other words, given $p_i$ in space P, a cluster $C_i$ is found in space $\Theta$ such that $p(C_i)=p_i$. Next, the dissimilarity $\mu$ (C, $C_i$) in space $\Theta$ between the clusters C and $C_i$ is calculated. The dissimilarity between clusters may involve multiplication of distances between points in the clusters by a weighing factor. See, for instance Eq. 2 and the discussion of Ward's dissimilarity measure. At lines 13-14, if $C_i$ is closer to C than current_NN, then current_NN is updated to $C_i$ and min_full_space_distance is updated to the dissimilarity measure between Ci and C.

In some embodiments, the search for k-nearest neighbors in space P may produce a good upper bound on the full-space distance to a true nearest neighbor of the cluster C. The hope is that the projections of some clusters close to C in dissimilarity will be included in the k-nearest neighbors in index space P, thus quickly reducing the radius of the search in space $\Theta$. But as long as k>0, the search in the two spaces will produce some upper bound and the algorithm can proceed.

In addition, if the newly located cluster $C_i$ is closer to C, then at lines 15-16, searched_bound_in_projected space is compared to the backed-out value of min_full_space_distance. The backed-out function derives a search radius r in P such that the projection of the nearest neighbor of C is guaranteed to appear within distance r of p(C). The key relation is, for any pair of points, distance in the P<=distance in $\Theta$<=dissimilarity. The radical in Ward's measure is an inflation factor from full-space distance to dissimilarity. The search is for a nearest neighbor in dissimilarity "space." When we have a candidate B' nearest neighbor for a fixed reference point C, the true nearest neighbor B can have any size and be at any distance consistent with the formula and inequality given the known size of A. The search radius r may be obtained by algebraically backing out the weighting factor used to determine distances between clusters, given the known distance from p($C_i$) to p(C) and the weight of the cluster p(C). The goal of the backed-out function, given C, |C|, and $\mu$ (C,C') is to choose a search radius in the index space that will guarantee finding the true nearest neighbor B. Any method that computes an upper bound on the distance in P at which the projection of the nearest neighbor of C will be located is valid. The use of the index for the space P is intended to quickly compute a fairly tight bound in the presence of a very large number of clusters.

With |A| fixed, Ward's weighting factor is an increasing function of |B| and indeed asymptotically approaches sqrt(2) if the best lower bound we can place on |B| is 1. It may be useful to keep track of the global minimum cluster size as the computation progresses; if it is known it may be used as well to compute a tighter bound on the distance to the nearest neighbor in P.

In some embodiments, it is possible to place a larger lower bound on |B|. As an example, begin with an array of 10 counters, initialize counter 1 to the size of the initial population, and the rest to zero. When merging clusters A and B, decrement the counters |A| and |B| and increment counter |A|+|B|. When the first counter reaches zero the lower bound for |B| becomes 2, and so on. In some embodiments, this technique may reduce the search radius in P because agglomerative clustering with Ward's metric tends to merge singletons early. Thus, the minimum size of |B| may increase relatively quickly. When the minimum cluster size has grown to 10, for example, it may no longer be useful to keep track of the array of counters. In that case, the population has been reduced by at least a factor of ten and more likely several hundred (up to 2^10 in an ideal case) and the slope of the weighting function is decreasing, so there are diminishing returns to keeping a larger counter array or a dynamic data structure.

Given the upper bound r on the distance to the nearest neighbor of C, a search for the nearest neighbor must exhaustively visit the projection in P of every cluster that could feasibly lie within that radius of the test cluster C. Since the variable searched_bound_in_projected_space tracks the value of maximum index-space distance encountered, it follows that if that distance is greater than the value r, and the search within that bound was exhaustive, then the current nearest neighbor $C_i$ is a nearest neighbor of C without the need for further searching. The search may be known to be exhaustive, for example, if the k-nearest neighbors were searched in increasing order of their distance from p(C) or if the search of the k-nearest neighbors was complete. Otherwise, if searched_bound_in_projected_space is less than the search radius r, a "contained by" spatial query in space P may be constructed using the facilities offered by the index library sufficient to guarantee all clusters within the computed index space radius are visited. The loop from lines 8-17 to look for a nearest neighbor may then be continued on the clusters returned in response to this query. When all query results have been inspected the best-so-far is known to be a nearest neighbor of the test cluster.

At lines 15-16, if current_NN is the nearest neighbor of C, that cluster is returned and the algorithm of Table 3 ends. If current_NN is not provably the nearest neighbor of C, then the loop of lines 8-17 continues by examining another cluster in S. If all clusters in S have been examined without locating a cluster that can be proved to be the nearest neighbor of C, then at lines 17-18, the value of k is increased, thus increasing the size of S, and the loop is repeated. Alternatively, a search in P to an exhaustive search of radius backed-out(min_full_space_distance) may be performed. The relative performance of the index data structures for k nearest neighbors versus bounding box queries may determine the choice of search method.

The initial value of k may be determined heuristically. In some embodiments, a measure of how frequently the heuristically-determined k nearest neighbors in index space are not sufficient to find a nearest neighbor in the full space ratio should be instrumented and a software feedback loop could be implemented to dynamically adjust the heuristic for determining the value k. In many embodiments, k may be initially selected as the square root of the number of points in Θ. Assuming that the search for nearest neighbor with this choice is k is usually successful, it can be proven that the expected time complexity of a nearest neighbor search is $O(h^{1.5})$, where h is the number of points in Θ.

The data in table 1 may be used to illustrate the method of table 3 under the assumptions that the points of P in row 2 are indexed and that each point of row 1 forms a cluster containing a single element. Suppose that it is desired to find the nearest neighbor of the cluster containing the point at E:1. At line 3 of table 1, a point v of the cluster is selected. The point (−1 1 −3 −4) is the only point of the cluster. At line 3-4, the set S of k-nearest neighbors of p(v) in P is located using indexing. P(v) is the point (−1, 5.10) at E:2 (for purposes of this example, points will be listed to two decimal places). For ease of illustration, select k=6. In increasing order of distance from E:2, the points of S are the points F:2 (distance 0.10), D:2 (distance 2.08), B:2 (distance 2.13), C:2 (distance 2.27), A:2 (distance 2.86), and H:2 (distance 3.96). Thus, after performing the loop from lines 7 through 17, searched_bound_in_projected_space=3.96, the maximum of the distances of the points in S from the point p(v).

In addition, for each of those points $p_i$ in P, at line 12, determine a point $v_i$ in Θ from which it was projected and the distance between the cluster containing that point $v_i$ and E:1. These points and distances are F:1 (distance 5.39), D:1 (distance 9.70), B:1 (distance 3.61), C:1 (distance 5.83), A:1 (distance 11.7), and H:1 (distance 10.49). At lines 13-14, determine the closest cluster. Of the 6 clusters in Θ that were examined, the cluster containing B:1 is nearest to the cluster containing E:1 in Θ and min_full_space_distance=3.61.

In addition, the test of lines 15-16 is satisfied. In this simple example based upon the data of Table II, where each cluster is a single point, the backed-out function is the identity function; that is, backed-out (v)=v. Thus, searched_bound_in_projected_space=3.96>backed-out (min_full_space_distance)=back-out (3.61)=3.61.

As a result, in space Θ, the cluster {B:1} is the closest cluster to the cluster {E:1}. This result is known without examination of the points G:1, I:1, and J:1. These clusters cannot be closer to E:1 than B:1 because the distance from their projections to space P is at least 3.96 from the projection of E:1. Thus, their distance from E:1 is at least 3.96 and they are further from E:1 than B:1, which is at a distance of 3.61.

In some embodiments, the algorithm of Table 3 may be performed in parallel. It is a property of the family of dissimilarity measures described herein that any pair of mutual nearest neighbors may be merged whenever they are found without upsetting the correctness of the algorithm. Thus, many nearest neighbor chains may be started. The separate chains may, for example, be started on separate threads. Each chain is free to merge pairs as it finds them provided that 1) the merge bookkeeping have proper concurrency controls and 2) some mechanism detects and resolves conflicting or redundant merges. Conflicts may arise when two threads identify identical or overlapping pairs of mutual nearest neighbors.

Three approaches may manage this possibility of conflict. Two involve preventing such merges from occurring and one relies on detecting and reversing them. A first approach can use locking (together with generation numbering or other common techniques as needed) to prevent merges at the cluster record level by applying the lock when a thread is preparing to commit a merge. This approach minimizes lock contention and related bus traffic but may cause threads to waste time refining doomed partial solutions. The term "lock" admits any variation, including lock-free techniques, that meets the requirements of the detailed implementation.

A second approach is to lock clusters when they are added to a chain. Abandon other chains (restart search on that thread) when they attempt to add a locked cluster. This approach adds some bus traffic but does not require an inspection of locks when examining clusters during the search nor when a mutual nearest neighbor pair is confirmed, but only at the conclusion of each chain-extending search. If long chains exist in the data this approach might tie up many clusters in locks. This problem, however, can be addressed heuristically—dropping prefixes of a chain does not affect the correctness of the algorithm. Note that locked nodes must not be skipped when conducting the search.

As a third approach, allow each thread to independently but locally commit a series of merges. Then, combine the speculative merge histories from all threads, eliminating those that are impossible due to conflicts, commit the survivors to shared memory, and allow all threads to resume searching in the updated population. This approach may have the best cache efficiency but may require careful design and testing of an auxiliary algorithm to prune the speculative merge list.

The third approach may extend to a distributed storage implementation in which the speculative merge list could be broadcast to all nodes and screened to identify any pairs that are not mutual nearest neighbors due to some cluster being closer to at least one member of the pair but not locally visible to the node that proposed the merge. If the node detecting the conflict replaces the proposed pair with an updated one in the next generation of the algorithm, all non-local pairs will eventually become merged clusters. If the original dispersal of points to worker nodes is based on some geometric scheme such as k-d trees then most early speculative mergers should be confirmed easily.

Returning to FIG. 1, at block 150, the pairs of MNNs are merged. Even though an MNN pair selected for merging may not be necessarily be the two nearest neighbors of the current set of clusters, it can be proven that for suitable choices of dissimilarity measure, the clustering algorithm of FIG. 1 produces a correct result by merging MNNs pairs in any order. One such suitable choice of dissimilarity measure is Ward's dissimilarity measure.

The merging may continue until all clusters have been merged into a single massive cluster or until a desired number of clusters has been produced. The centroid vector and new cluster weight of the new cluster may be computed in the space Θ, and the bookkeeping for the data structures in Θ may be updated. In addition, in some embodiments, similar updating may be done in space P to the projection of the new cluster and the projections of the clusters from which the new cluster was formed.

In some embodiments, once a nearest neighbor chain has been generated and a pair of clusters found to be MNNs and merged, subsequent applications of the methods of FIG. 3 and Table 1 can be made faster. If the merger left clusters in the NN chain, then the last (top) cluster in the chain had one of the merged pair as a nearest neighbor and thus will be close to the newly merged cluster. Say the NN chain was {B, C, D} and C and D were merged to form Z. Then, the method of FIG. 3 can return to the chain extension with initial chain {B} and best so far initialized to (Z, d(B, Z)). In this case, a nearest neighbor of the first element of the chain has already been located. If, however, the NN chain was {A, B, C, D} and C and D were merged, then d(B, A) and d(B,Z) can be compared. If A is closer to B, the NN search can begin with A as the initial nearest neighbor of B, just as in the original steady-state chain extension. If Z is closer to B, further search must be performed. Because of the receding center property of merged clusters, another cluster may now be nearest. Even in this case, the parameter min_full_space_distance of Table 1 can be initialized to (Z,d(B,Z)). In both of these cases, there may be a fairly tight search radius to begin the search with.

If removing the pair of clusters that were merged has left the NN chain empty, then we find ourselves back at the starting point of the algorithm. Choosing the newly merged cluster as the starting point for the new chain will result in good data locality as the neighbors of the ancestor clusters will have been recently visited.

As an implementation detail in some embodiments, when merging two nodes, one of the nodes may be used to store the data about the merged node and the other node deleted from a list of nodes and clusters. As an alternative, when two nodes are merged, both are be deleted and a new node representing the merged cluster should be added. Any implementation that updates the data structures so that further computations proceed as if the clusters to be merged were deleted and the new cluster added is acceptable.

As a result of the indexing and the selection of a dimension m for space P that is considerably smaller than the dimension n of space Θ, it may be considerably faster to find nearest neighbors and to form clusters by the method of FIG. 1 than by algorithms currently in use, especially when the number of points in Θ is large, such as in the neighborhood of one million points or more. In some tests, the time complexity of the method of FIG. 1 may be performed in $O(h^{1.5})$, where h is the number of points in Θ.

In some embodiments, the method of FIG. 1 may be used to detect errors in a fabrication process, such as which corner of a chip has the most errors because a machine is out of tolerance. An end-to-end manufacturing process may produce a large number of points of collected data about the error tolerances in the manufactured chips. The method of FIG. 1 may be used to form clusters of these points for visual display. By observing the display, users may be able to spot problems in the fabrication process. In embodiments where Θ is not a vector space, and μ does not satisfy the requirements of a metric on a metric space, any dimensions that are not naturally Euclidean may be coerced into a Euclidean working space as part of the data preparation stage for agglomerative clustering, Under the assumptions that the dissimilarity measure μ in Θ is a monotone function of a sum of non-negative contributions and that a substantial contribution to μ is from a Euclidean subset of the input dimensions, then projecting and indexing may be performed as indicated above. Operations in Θ that require special treatment for the non-Euclidean dimensions may be performed by pre-existing algorithms for performing clustering in Θ.

Figure 5:
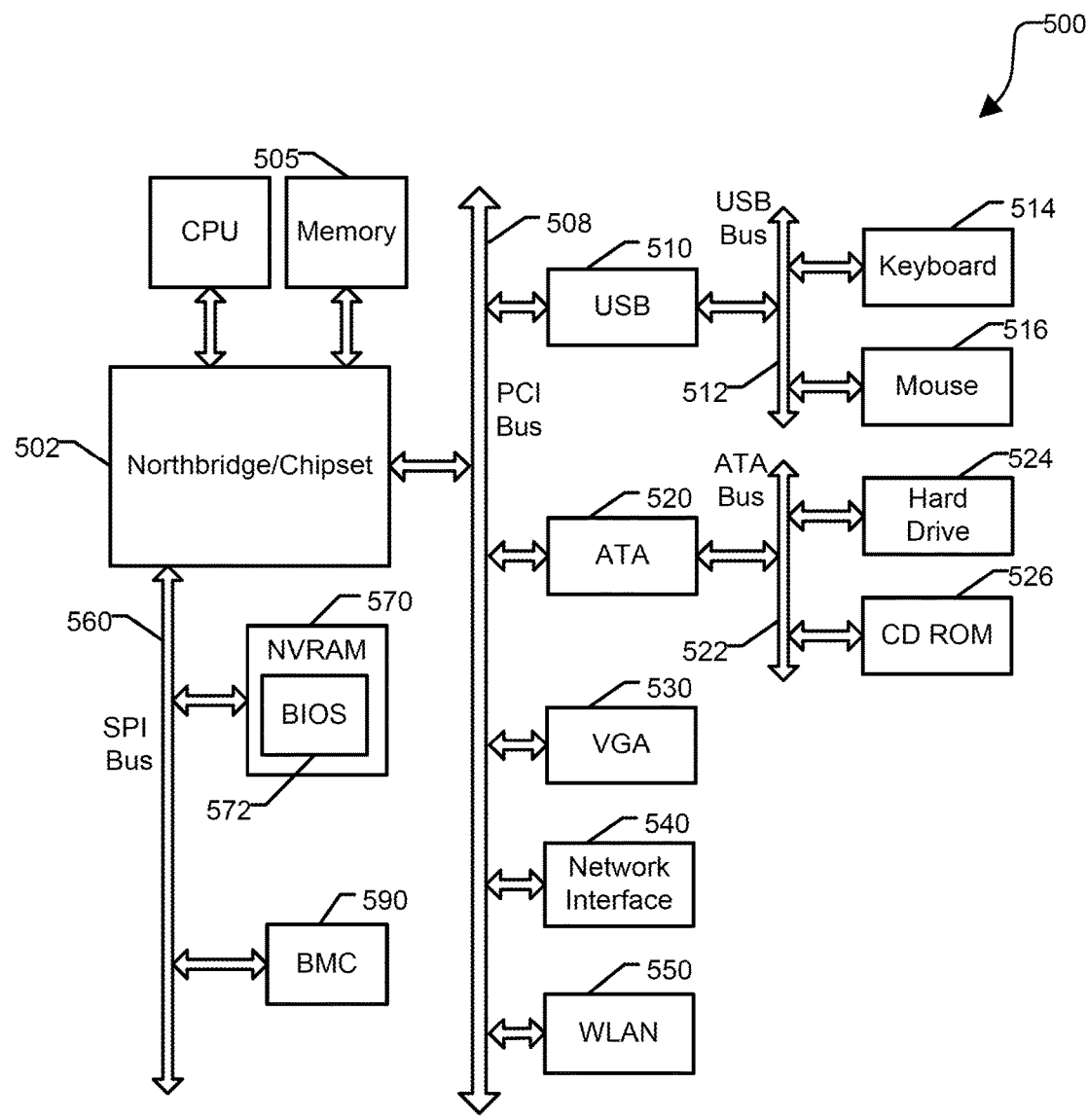
FIG. 5 is a block diagram of an information handling system.

FIG. 5 illustrates an information handling system 500 including a processor 502, a memory 504, a northbridge/chipset 506, a PCI bus 508, a universal serial bus (USB) controller 510, a USB 512, a keyboard device controller 514, a mouse device controller 516, an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a non-volatile random access memory (NVRAM) 570 for storing a basic input/output system (BIOS) 572, and a baseboard management controller (BMC) 590. Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of northbridge/chipset 506 can be integrated within CPU 502.

For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as CPU 502, a programmable logic array (PLA), an embedded device such as a System-on-a-Chip (SoC), or other control logic hardware. Information handling system 500 can also include one or more computer-readable medium for storing machine-executable code, such as software or data.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, i.e. a consistent way for application programs and operating systems to interact with devices, such as a keyboard, a display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

In an embodiment, the BIOS 572 can be substantially compliant with one or more revisions of the UEFI specification. The UEFI standard replaces the antiquated personal computer BIOS system found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 500. While the techniques disclosed herein are described in the context of a UEFI compliant system, one of skill will appreciate that the disclosed systems and methods can be implemented at substantially any information handling system having firmware.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer implemented method for improving, using multi-dimensional indexing data structures, a process of finding nearest neighbors for points, in multi-dimensional spaces, associated with a manufacturing process, the computer comprising a processor and memory, the method comprising:
   powering the computer;
   in response to powering the computer, executing an initialization procedure for the computer, the initialization procedure comprising configuring the memory and initializing one or more device drivers for communicating with one or more devices;
   providing a multi-dimensional indexing data structure in the memory, the multi-dimensional indexing data structure comprising at least one of an R-tree data structure or a KD-tree data structure;
   projecting, using at least one processor associated with the multi-dimensional indexing data structure, an n-dimension space $\Theta$, with a dissimilarity measure $\mu$ into an m-dimensional space P with a dissimilarity measure $\mu'$ by a projection function p, wherein:

$1 < m < n$; and $\mu'(p(v1),p(v2)) \leq \mu(v1,v2)$ for all points $v1$ and $v2$ in $\Theta$;

selecting, using the at least one processor associated with the multi-dimensional indexing data structure, a point v in $\Theta$;
   performing, using the at least one processor associated with the multi-dimensional indexing data structure, a search in P for a set S' of k nearest neighbors of the point p(v) in P;
   finding, using the at least one processor associated with the multi-dimensional indexing data structure, a set S of all points in $\Theta$ that project to the set S'; and
   determining, using the at least one processor associated with the multi-dimensional indexing data structure, whether a point of the set S is a nearest neighbor of the point v,
   wherein determining whether the point of the set S is the nearest neighbor of the point v enables determination of a problem or an issue associated with the manufacturing process.

2. The computer implemented method of claim 1, wherein $3 \leq m \leq 5$, and wherein $n \geq 1000$.

3. The computer implemented method of claim 1, wherein the projecting comprises:
   selecting a principal component u of $\Theta$ using principal component analysis; and
   projecting points v of $\Theta$ onto u.

4. The computer implemented method of claim 1, wherein the projecting comprises:
   selecting a set PC of principal components of $\Theta$ using principal component analysis, wherein the set PC contains principal components for $0 \leq s < n$;
   projecting $\Theta$ onto the principal components of the set PC;
   determining an additional principal component u of $\Theta$ that captures the most remaining variance after removing the variance captured by projecting $\Theta$ onto the principal components of the set PC;

if u captures at least 1/m-s of the remaining variance, projecting points v of Θ onto u; and
otherwise:
selecting a j-dimensional space J contained in Θ, where j>1; and
projecting the points v onto their norm in the space J.

5. The computer implemented method of claim 1, wherein:
the method further comprises indexing the space P using a spatial indexing technique suitable for finding the k-nearest neighbors of a point or cluster and suitable for performing a bounding-box search, both in spaces of a small fixed dimension; and
the performing comprises using the indexing to find the set S'.

6. The computer implemented method of claim 1, further comprising:
selecting a cluster C in Θ;
performing a search in P for a set T' of k nearest neighbors of a cluster p(C) in P;
finding a set T of all clusters in Θ that project to the set T';
determining whether a cluster C' of the set T is a nearest neighbor of the cluster C; and
if C' is a nearest neighbor of the cluster C, merging C and C' to form a cluster.

7. The computer implemented method of claim 6, further comprising:
initially setting k to an integer within 1 of the square root of n;
for each cluster D of a plurality of clusters in Θ, searching for the nearest neighbor of D by:
finding the k-nearest neighbors of the cluster p(D) in P;
finding a set of clusters S" in Θ based upon the k-nearest neighbors; and
searching for a nearest neighbor of D' in S"; and
adjusting k based upon how often S" contains a nearest neighbor of C'.

8. The computer implemented method of claim 6, wherein:
determining whether the cluster C' in S is a nearest neighbor of the cluster C comprises:
determining that no other cluster in T is closer to C than C';
determining whether all clusters D in P for which μ' (D, p(C))≤backed-out (μ(C',C) are members of T';
if so, returning C' as a closest neighbor of C; and
if not, increasing the value of k to k' and performing a search in P for a set T'" of k' nearest neighbors of the cluster p(C) in P.

9. The computer implemented method of claim 6, wherein:
determining whether the cluster C' in S is a nearest neighbor of the cluster C comprises:
determining that no other cluster in T is closer to C than C';
determining whether all clusters D in P for which μ'(D, p(C))≤backed-out (μ(C',C) are members of T';
if so, returning C' as a closest neighbor of C; and if not:
performing a bounding-box search in P for a set U' of all clusters D for which μ'(D, p(C))≤backed-out (μ(C',C); and
finding a set U of clusters in Θ that project to the set U'; and
searching the set U for a nearest neighbor of the cluster C.

10. The computer implemented method of claim 6, further comprising searching for mutual nearest neighbors by generating a chain of nearest neighbor clusters, wherein:
a first cluster of the chain is the cluster C;
each successor cluster in the chain is a nearest neighbor of an immediately previous cluster in the chain; and
a last cluster in the chain and a second-last cluster in the chain are mutual nearest neighbors.

11. The computer implemented method of claim 10, further comprising:
merging the last cluster and the second-last cluster in the chain of nearest neighbors;
selecting a cluster of the chain other than the last cluster and the second-last cluster; and
generating another chain of nearest neighbor clusters, wherein the first cluster of the other chain is the selected cluster of the chain.

12. The computer implemented method of claim 10, further comprising generating a plurality of chains of nearest neighbor clusters in parallel.

13. A computer implemented method for improving, using multi-dimensional indexing data structures, a process of finding nearest neighbors for points, in multi-dimensional spaces, associated with a manufacturing process, the computer comprising a processor and memory, the method comprising:
powering the computer;
in response to powering the computer, executing an initialization procedure for the computer, the initialization procedure comprising configuring the memory and initializing one or more device drivers for communicating with one or more devices;
providing a multi-dimensional indexing data structure in the memory;
projecting, using at least one processor associated with the multi-dimensional indexing data structure, an n-dimension space Θ with a dissimilarity measure μ into an m-dimensional space P with a dissimilarity measure μ' by a projection function p, wherein:

$1 \leq m < n;$ $(\mu'(p(v1),p(v2)) \leq \mu(v1,v2)$ for all points $v1$ and $v2$ in Θ; and the projecting comprises:
selecting, using at least one processor associated with the multi-dimensional indexing data structure, a j-dimensional space J of Θ, where j>1; and
projecting, using at least one processor associated with the multi-dimensional indexing data structure, points v onto their norm in the space J; and
selecting, using at least one processor associated with the multi-dimensional indexing data structure, a point v in Θ;
performing, using at least one processor associated with the multi-dimensional indexing data structure, a search in P for a set 'S' of k nearest neighbors of the point p(v) in P;
finding, using at least one processor associated with the multi-dimensional indexing data structure, a set S of points in Θ that project to the set S'; and
determining, using at least one processor associated with the multi-dimensional indexing data structure, whether a point of the set S is a nearest neighbor of the point v, wherein determining whether the point of the set S is the nearest neighbor of the point v enables determination of an issue associated with the manufacturing process.

14. The computer implemented method of claim 13, wherein the projecting further comprises:
   selecting a principal component u of Θ using principal component analysis; and
   projecting points v of Θ onto u.

15. The computer implemented method of claim 13, wherein the projecting further comprises:
   selecting a set PC of principal components of Θ using principal component analysis, wherein the set PC contains principal components for $0 \leq s < n$;
   projecting Θ onto the principal components of the set PC;
   determining a principal component u of Θ that captures the most remaining variance;
   if u captures at least 1/m-s of the remaining variance, projecting points v of Θ onto u; and
   otherwise projecting points v onto their norm in the space J.

16. A computer program product embodied in a non-transitory computer readable medium and comprising computer instructions for:
   powering a computer;
   in response to powering the computer, executing an initialization procedure for the computer, the initialization procedure comprising configuring a memory and initializing one or more device drivers for communicating with one or more devices;
   providing a multi-dimensional indexing data structure in the memory, the multi-dimensional indexing data structure comprising at least one of an R-tree data structure or a KD-tree data structure;
   projecting, using at least one processor associated with the multi-dimensional indexing data structure, an n-dimension space Θ, with a dissimilarity measure μ into an m-dimensional space P with a dissimilarity measure μ' by a projection function p, wherein:

$1 < m < n$; and $\mu'(p(v1), p(v2)) \leq \mu(v1, v2)$ for all points $v1$ and $v2$ in Θ;

selecting, using the at least one processor associated with the multi-dimensional indexing data structure, a point v in Θ;
   performing, using the at least one processor associated with the multi-dimensional indexing data structure, a search in P for a set S' of k nearest neighbors of the point p(v) in P;
   finding, using the at least one processor associated with the multi-dimensional indexing data structure, a set S of all points in Θ that project to the set S'; and
   determining, using the at least one processor associated with the multi-dimensional indexing data structure, whether a point of the set S is a nearest neighbor of the point v,
   wherein determining whether the point of the set S is the nearest neighbor of the point v enables determination of a problem or an issue associated with the manufacturing process.

17. The computer program product of claim 16, wherein the projecting comprises:
   selecting a principal component u of Θ using principal component analysis; and
   projecting points v of Θ onto u.

18. The computer program product of claim 16, wherein the projecting comprises:
   selecting a set PC of principal components of Θ using principal component analysis, wherein the set PC contains principal components for $0 \leq s < n$;
   projecting Θ onto the principal components of the set PC;
   determining an additional principal component u of Θ that captures the most remaining variance after removing the variance captured by projecting Θ onto the principal components of the set PC;
   if u captures at least 1/m-s of the remaining variance, projecting points v of Θ onto u; and
   otherwise:
   selecting a j-dimensional space J contained in Θ, where $j > 1$; and
   projecting the points v onto their norm in the space J.

19. The computer program product of claim 16, further comprising computer instructions for indexing the space P using a spatial indexing technique suitable for finding the k-nearest neighbors of a point or cluster and suitable for performing a bounding-box search, both in spaces of a small fixed dimension; and the performing comprises using the indexing to find the set S'.

20. The computer program product of claim 16, further comprising computer instructions for:
   selecting a cluster C in Θ;
   performing a search in P for a set T' of k nearest neighbors of a cluster p(C) in P;
   finding a set T of all clusters in Θ that project to the set T';
   determining whether a cluster C' of the set T is a nearest neighbor of the cluster C; and
   if C' is a nearest neighbor of the cluster C, merging C and C' to form a cluster.

* * * * *